United States Patent
Wang et al.

(10) Patent No.: US 7,089,649 B2
(45) Date of Patent: Aug. 15, 2006

(54) METHOD OF ESTIMATING A THERMAL POLE TIP PROTRUSION FOR A HEAD GIMBAL ASSEMBLY

(75) Inventors: Geng Wang, San Jose, CA (US); Hae Jung Lee, Santa Clara, CA (US); Keung Youn Cho, San Jose, CA (US); Sang Lee, Pleasonton, CA (US)

(73) Assignee: Samsung Electronics Co. Ltd,, Suwon (KR)

( * ) Notice: Subject to any disclaimer, the term of this patent is extended or adjusted under 35 U.S.C. 154(b) by 228 days.

(21) Appl. No.: 10/256,553

(22) Filed: Sep. 26, 2002

(65) Prior Publication Data

US 2004/0060167 A1    Apr. 1, 2004

(51) Int. Cl.
*G11B 5/127*    (2006.01)
*H04R 31/00*    (2006.01)

(52) U.S. Cl. ............... 29/603.09; 29/603.03; 29/603.04; 29/603.05; 29/603.07; 360/31; 360/97.01; 360/234.5; 360/244; 360/245; 360/294.4

(58) Field of Classification Search ............. 360/234.5, 360/294.4–294.7, 240, 244, 244.2, 244.8, 360/245.9, 31, 97.01, 245; 29/603.04, 603.05, 29/603.07, 603.09, 631.1, 603
See application file for complete search history.

(56) References Cited

U.S. PATENT DOCUMENTS 6,105,381 A * 8/2000 Ghoshal .................... 62/259.2
6,760,182 B1 * 7/2004 Bement et al. ................ 360/75
6,813,118 B1 * 11/2004 Pust et al. ................ 360/234.5
6,859,343 B1 * 2/2005 Alfoqaha et al. ........... 360/126

FOREIGN PATENT DOCUMENTS

JP    2003141704 A * 5/2003

OTHER PUBLICATIONS

"Thermomechanical head performance"; Pust, L.; Rea, C.J.T.; Gangopadhyay, S.; Magnetics, IEEE Transactions on , vol. 38 , Issue: 1 , Jan. 2002; pp. 101-106.*

* cited by examiner

*Primary Examiner*—Paul D. Kim
(74) *Attorney, Agent, or Firm*—GSS Law Group; Earle Jennings; Gregory Scott Smith (57) ABSTRACT

Thermal pole tip protrusion is caused by materials in and around head slider expanding during write operations till they protrude, leading to contact with the rotating disk surface, altering the flying height and often wearing down part of the disk surface. While well known that read-write heads expand during writing, the inventors who recognized this situation's significance, particularly as flying height decreases and data rates increase, both required for high areal density disk drives. The inventors realized that they could detect the problem at the spin stand level by testing head gimbal assemblies to reliably, and inexpensively, predict the tendency for thermal pole tip protrusion. This leads to selection of head gimbal assemblies, which do not have the thermal pole tip protrusion tendency. The selected head gimbal assemblies have better reliability, as do actuators and disk drives made with the selected head gimbal assemblies.

8 Claims, 8 Drawing Sheets

METHOD OF ESTIMATING A THERMAL POLE TIP PROTRUSION FOR A HEAD GIMBAL ASSEMBLY

TECHNICAL FIELD

This invention relates to improving disk drive reliability by removing head gimbal assemblies with thermal pole tip protrusion tendencies early in the manufacturing process.

BACKGROUND ART

Disk drives are an important data storage technology. Read-write heads are one of the crucial components of a disk drive, directly communicating with a disk surface containing the data storage medium. Read-write heads generate heat during write operations due to the large currents required for that operation. The inventors have discovered quality problems associated with thermal expansion, causing tip protrusion. A review of the relevant background will be made before discussing their discovery of the problem and their solutions.

Figure 1A:
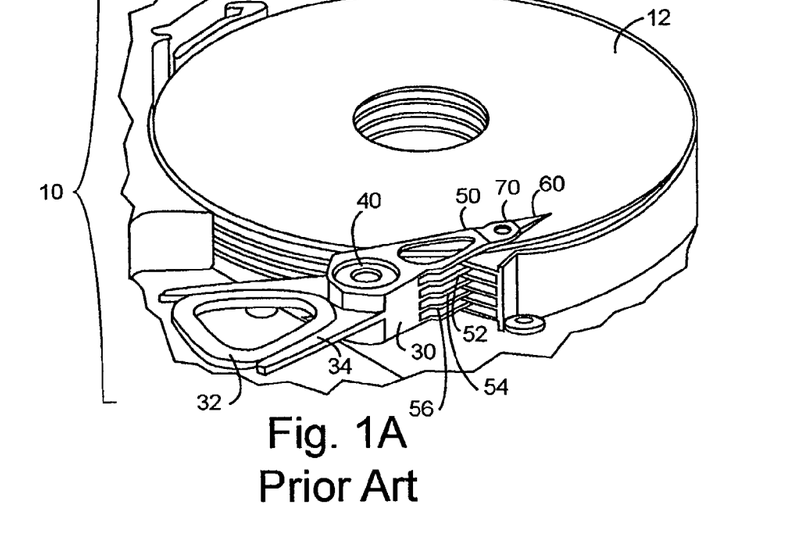
FIG. 1A illustrates a typical prior art high capacity disk drive 10 including actuator arm 30 with voice coil 32, actuator axis 40, suspension or head arms 50–58 with slider/head unit 60 placed among the disks.

FIG. 1A illustrates a typical prior art high capacity disk drive 10 including actuator arm 30 with voice coil 32, actuator axis 40, head arms 50–58 with head suspension assembly 60 placed among the disks.

Figure 1B:
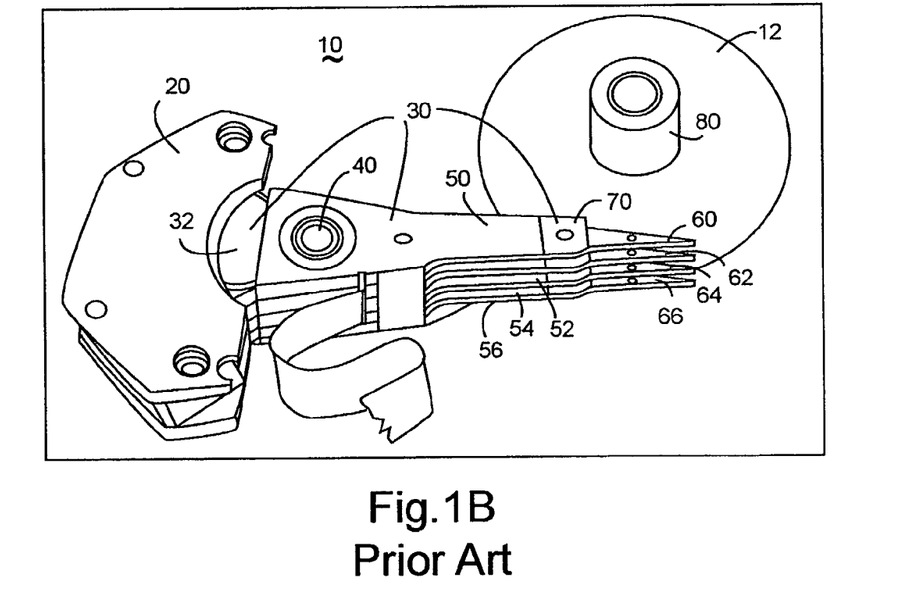
FIG. 1B illustrates a typical prior art high capacity disk drive 10 with actuator 20 including actuator arm 30 with voice coil 32, actuator axis 40, head arms 50–56 and slider/head units 60–66 with the disks removed.

FIG. 1B illustrates a typical prior art high capacity disk drive 10 with actuator 20 including actuator arm 30 with voice coil 32, actuator axis 40, head arms 50–56 and head suspension assemblies 60–66 with the disks removed.

Figure 2A:
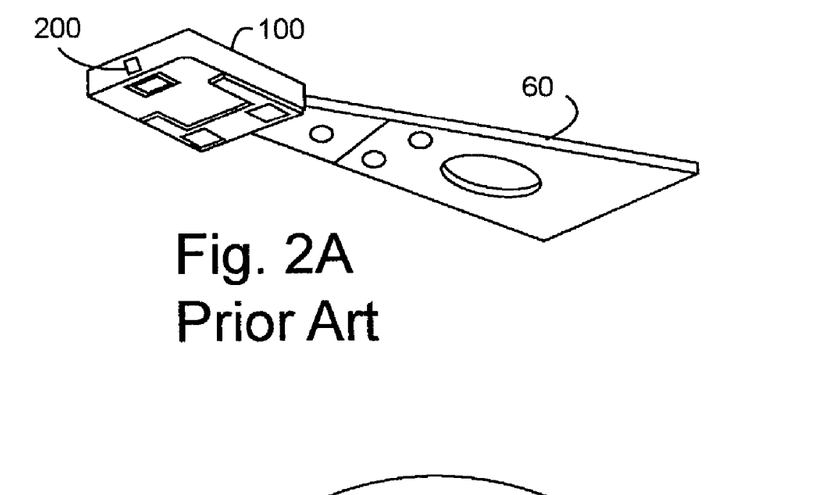
FIG. 2A illustrates a suspended head slider 60 containing the read-write head 200 of the prior art.

FIG. 2A illustrates a head gimbal assembly including head suspension assembly 60 with head slider 100 containing the read-write head 200 of the prior art.

Since the 1980's, high capacity disk drives 10 have used voice coil actuators 20–66 to position their read-write heads over specific tracks. The heads are mounted on head sliders 100, which float a small distance off the disk drive surface when in operation. The flotation process is referred to as an air bearing. The air bearing is formed by the read-write heads 200, illustrated in FIG. 2A, and head slider 100, as illustrated in FIGS. 1A–2A. The flying height of the air bearing is very small, often about 100 Angstroms, or about 0.4 millionths of an inch, which is far smaller than a human hair.

Often there is one head per head slider for a given disk drive surface. There are usually multiple heads in a single disk drive, but for economic reasons, usually only one voice coil actuator.

Voice coil actuators are further composed of a fixed magnet actuator 20 interacting with a time varying electromagnetic field induced by voice coil 32 to provide a lever action via actuator axis 40. The lever action acts to move head gimbal assemblies 50–56, positioning head suspension assemblies 60–66, and their associated head sliders 100 containing read-write heads 200, over specific tracks with speed and accuracy. Actuator arms 30 are often considered to include voice coil 32, actuator axis 40, head gimbal assemblies 50–56 and head suspensions 60–66. An actuator arm 30 may have as few as a single head gimbal assembly 50. A single head gimbal assembly 52 may connect with two head suspensions 62 and 64, each with at least one head slider.

Figure 2B:
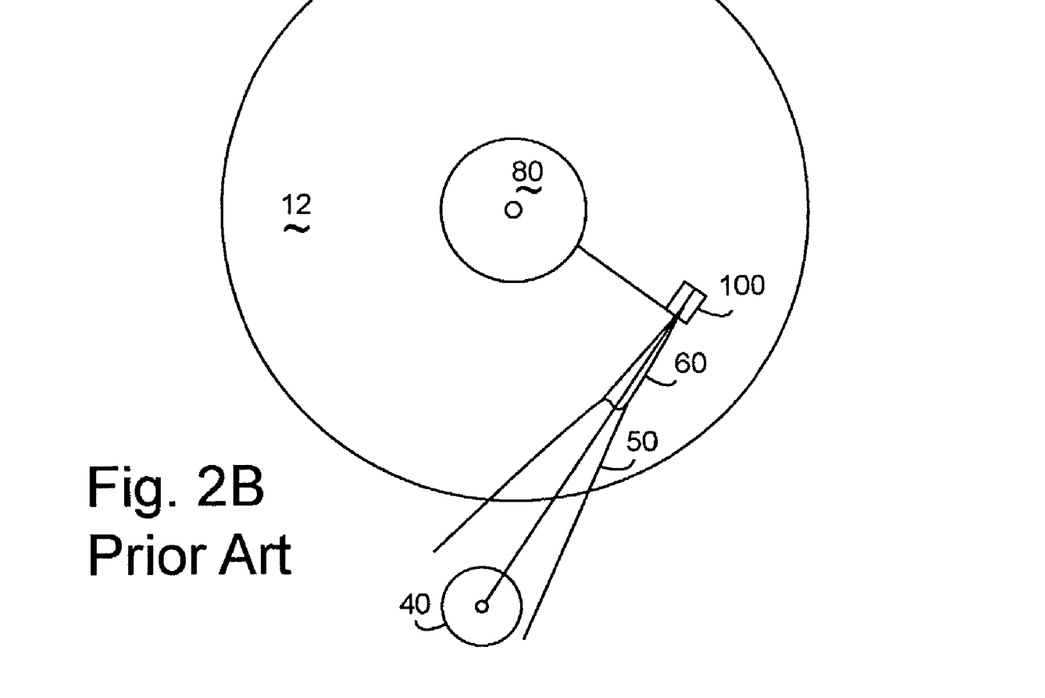
FIG. 2B illustrates the relationship between the principal axis 110 of an actuator arm 50 containing suspension 60, which in turn contains head slider 100, as found in the prior art.

FIG. 2B illustrates the relationship between the principal axis 110 of an actuator arm 50 containing suspension 60, which in turn contains head slider 100, as found in the prior art.

Figure 2C:
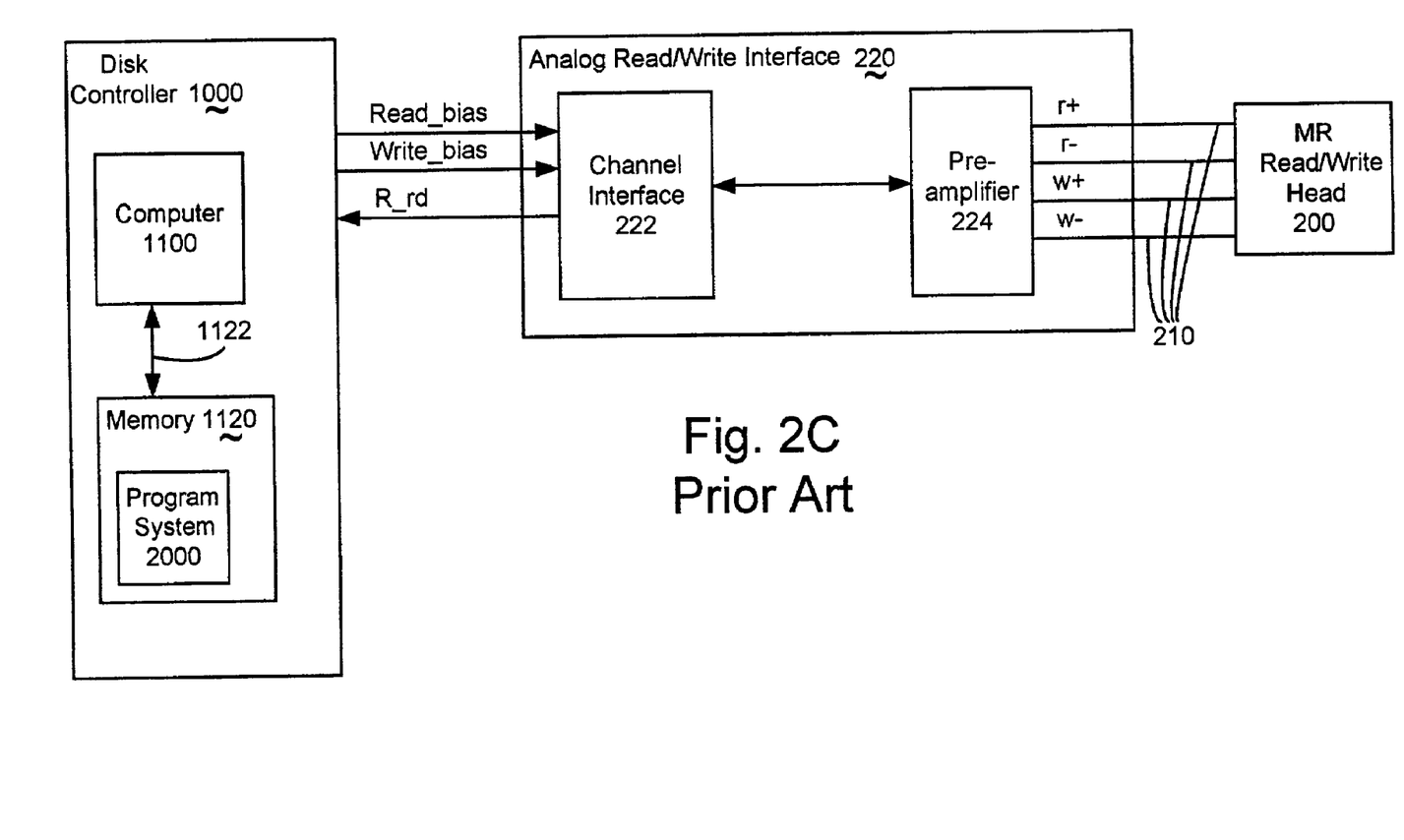
FIG. 2C illustrates a simplified schematic of a disk drive controller 1000 of the prior art, which may be used to control a spin stand test unit.

FIG. 2C illustrates a simplified schematic of a disk drive controller 1000 of the prior art, which may be used to control a spin stand test unit.

Disk drive controller 1000 controls an analog read-write interface 220 communicating resistivity found in the spin valve within read-write head 200. Disk drive controller 1000 concurrently controls servo-controller 240 driving voice coil 32, of the voice coil actuator, to position read-write head 200 to access a rotating magnetic disk surface 12 of the prior art.

Analog read-write interface 220 frequently includes a channel interface 222 communicating with pre-amplifier 224. Channel interface 222 receives commands, from embedded disk controller 100, setting at least the read_bias and write_bias.

Various disk drive analog read-write interfaces 220 may employ either a read current bias or a read voltage bias. By way of example, the resistance of the read head is determined by measuring the voltage drop (V_rd) across the read differential signal pair (r+ and r−) based upon the read bias current setting read_bias, using Ohm's Law.

Figure 2D:
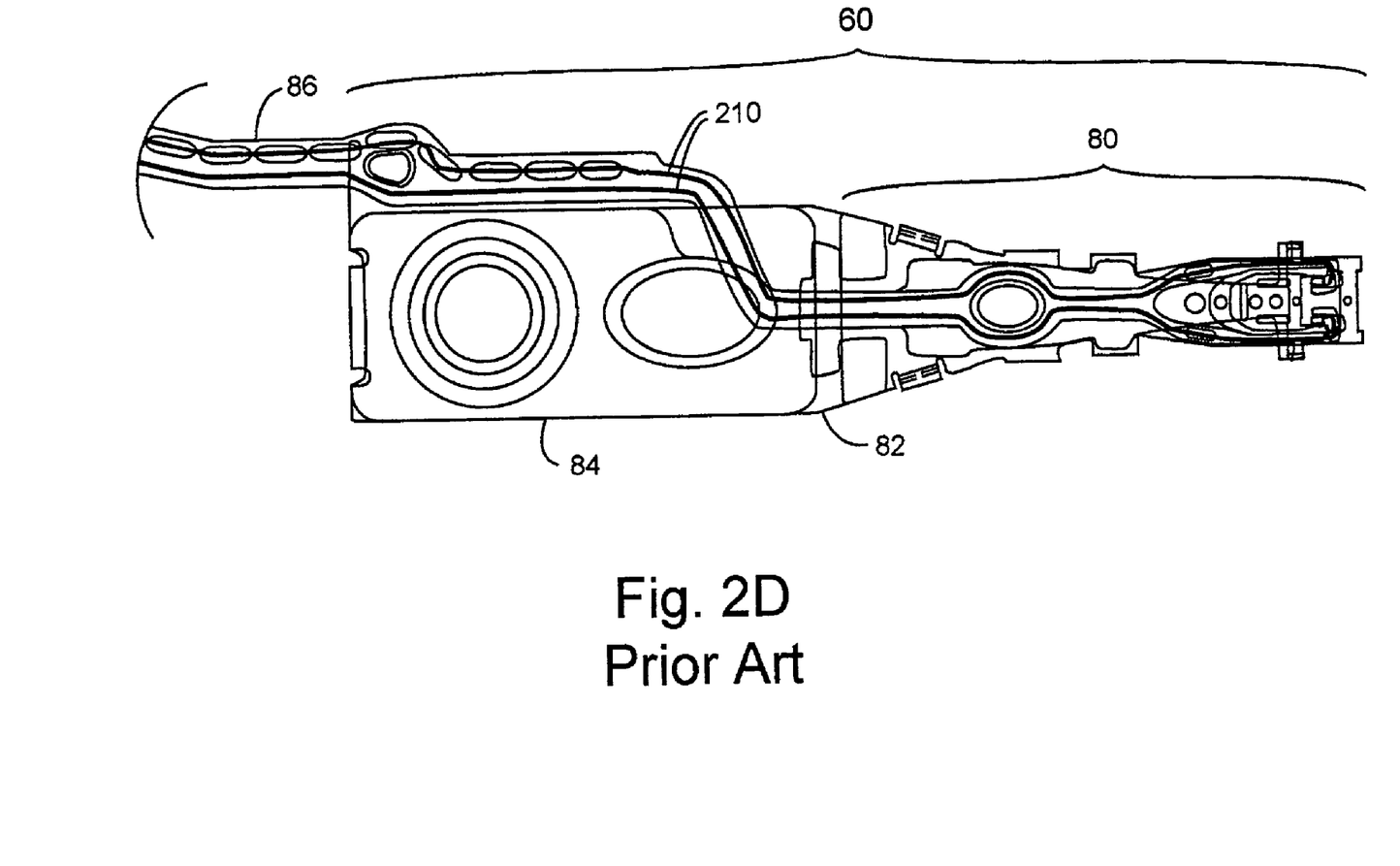
FIG. 2D illustrates a detailed view head suspension 60 of the prior art.

FIG. 2D illustrates a detailed view head suspension 60 of the prior art.

A prior art head suspension 60 includes suspension load beam 80 mechanically coupled via hinge 82 with extended base plate 84. Head suspension 60 further includes flexure 86, providing electrical interconnections of the read and write differential signal pairs 210, between the disk drive analog interface 220 and read-write head 200 (both in FIG. 2C).

The head gimbal assembly includes head slider 100 rigidly mounted on head suspension 60, with read-write head 200 electrically connected to flexure 86. Head slider 100 is mounted over the right portion of suspension load beam 80 so that read-write head 200 makes contact with flexure 86.

The hinge 82 includes a spring mechanism. Suspension load beam 80, hinge 82 and extended base plate 84 are all typically made from stainless steel. Flexure 86 is a flex printed circuit typically made using polyamide and copper traces.

What is needed are reliable head gimbal assemblies and actuators, which will minimize read-write head crashes by reliably maintaining the flying height, even as the flying height decreases and the data rates increase, to insure the quality of the disk drives in which they are used. The inventors know of no known discussion of the relationship between thermal pole tip protrusion to reliably maintaining the flying height.

SUMMARY OF THE INVENTION

Thermal pole tip protrusion is caused by the materials in and around the head slider expanding during write operations till part of those materials protrude, leading to contact with the rotating disk surface. Contact can degrade the write performance by altering the flying height. Contact can also wear down part of the disk surface.

While it is well known that read-write heads expand during writing, the inventors are unaware of anyone else who recognized this situation's significance, particularly as the flying height decreases and the data rates increase, both of which are required for high areal density disk drives.

The inventors realized that they could detect the problem at the spin stand level by testing head gimbal assemblies to reliably, and inexpensively, predict the tendency for thermal pole tip protrusion. This leads to selection of head gimbal assemblies, which do not have the thermal pole tip protrusion tendency. The selected head gimbal assemblies have better reliability, as do actuators and disk drives made with the selected head gimbal assemblies.

These and other advantages of the present invention will become apparent upon reading the following detailed descriptions and studying the various figures of the drawings.

DETAILED DESCRIPTION OF THE INVENTION

Thermal pole tip protrusion is caused by the materials in and around the head slider expanding during write operations until part of those materials protrude, leading to contact with the rotating disk surface. Contact can degrade the write performance by altering the flying height. Contact can also wear down part of the disk surface.

While it is well known that read-write heads expand during writing, the inventors are unaware of anyone else who recognized this situation's significance, particularly as the flying height decrease and the data rates increase, which is required for high areal density disk drives.

The inventors realized that they could detect the problem at the spin stand level by testing head gimbal assemblies to reliably, and inexpensively, estimate the tendency for thermal pole tip protrusion. This leads to selection of head gimbal assemblies, which do not have the thermal pole tip protrusion tendency. The selected head gimbal assemblies have better reliability, as do actuators and disk drives made with the selected head gimbal assemblies.

In the following figures will be found flowcharts of at least one method of the invention possessing arrows with reference numbers. These arrows will signify flow of control and sometimes data supporting implementations, including at least one program step, or program thread, executing upon a computer, inferential links in an inferential engine, state transitions in a finite state machine, and dominant learned responses within a neural network.

The operation of starting a flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network.

A computer as used herein will include, but is not limited to an instruction processor. The instruction processor includes at least one instruction processing element and at least one data processing element, each data processing element controlled by at least one instruction processing element.

Figure 3A:
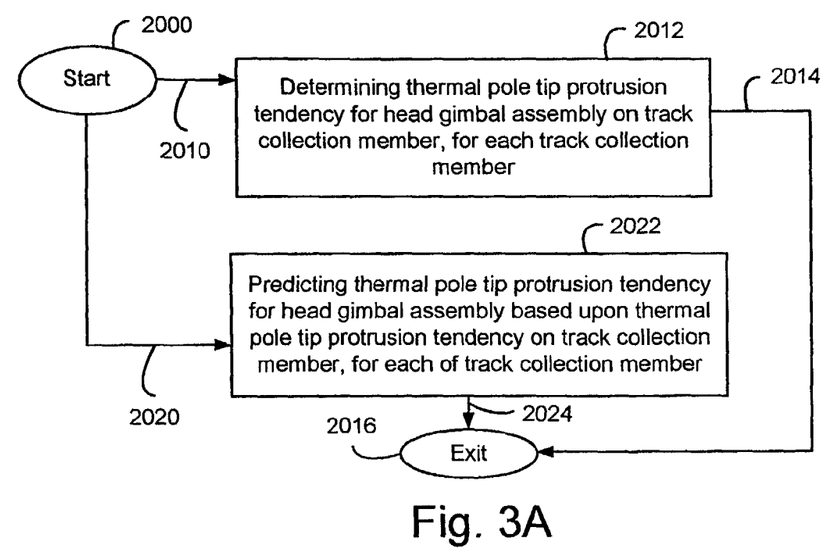
FIG. 3A illustrates an extension of program system 2000 of FIG. 2C estimating a thermal pole tip protrusion tendency for a head gimbal assembly containing a read-write head.

FIG. 3A illustrates an extension of program system 2000 of FIG. 2C estimating a thermal pole tip protrusion tendency for a head gimbal assembly containing a read-write head.

Operation 2012 performs determining the thermal pole tip protrusion tendency for the head gimbal assembly on the track collection member, for each track collection member. Operation 2022 performs predicting the thermal pole tip protrusion tendency for the head gimbal assembly based upon, for each of the track collection members, the thermal pole tip protrusion tendency on the track collection member.

The track collection includes at least an inside diameter track of a disk surface and an outside diameter track of the disk surface. The track collection may further preferably include a middle diameter track of the disk surface.

The invention utilizes the following, for each of the track collection members. The read-write head can provide a magneto-resistance from a disk surface while performing a write operation to the track collection member on the disk surface, as well as provide a voltage while reading the track collection member at a bias current. The disk surface rotates at a rotational frequency during these operations. Typical rotational frequencies include the following: 120 Hz for a 7200 RPM disk and 240 Hz for a 14400 RPM disk.

Figure 3B:
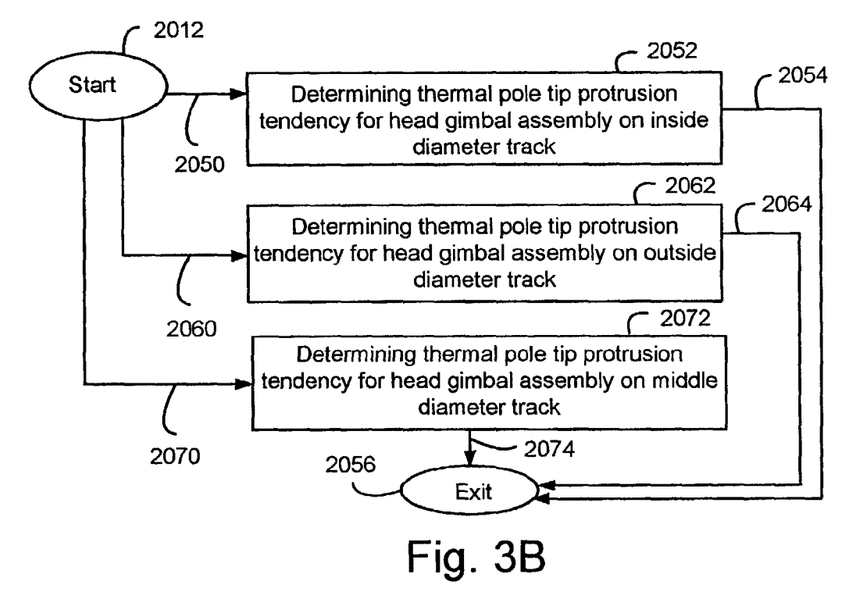
FIG. 3B illustrates a detail flowchart of operation 2010 of FIG. 3A further determining the thermal pole tip protrusion tendency for a track collection member, as at least one, and often preferably both, of the operations in this flowchart.

FIG. 3B illustrates a detail flowchart of operation 2010 of FIG. 3A further determining the thermal pole tip protrusion tendency for a track collection member, as at least one, and often preferably both, of the operations in this flowchart.

Operation 2052 performs monitoring a change of the magneto-resistance while the read-write head performs the write operation on the track collection member to determine the thermal pole tip protrusion tendency. Operation 2062 performs detecting an amplitude modulation envelope for the voltage at essentially the rotational frequency for the track collection member written to determine the thermal pole tip protrusion tendency.

Figure 4A:
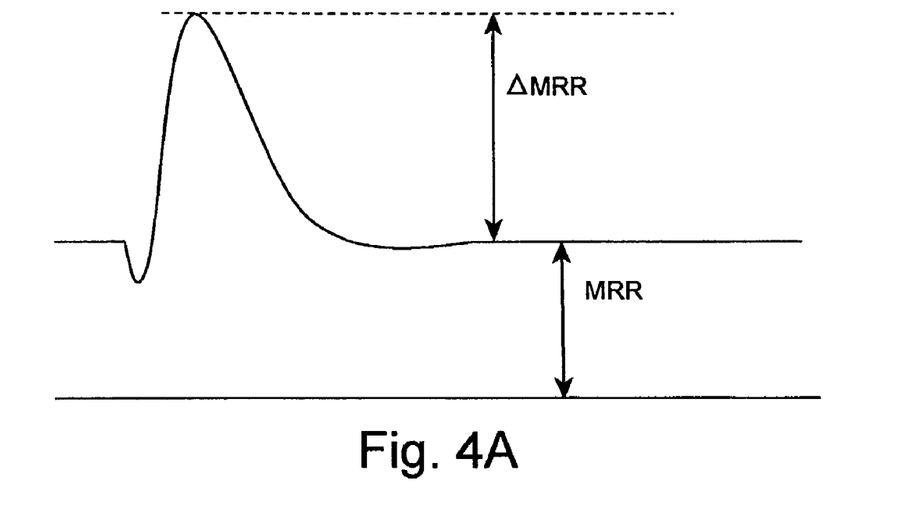
FIG. 4A illustrates a sudden MRR change event with an amount MRR change (ΔMRR) and a MRR value.

FIG. 4A illustrates a sudden MRR change event with an amount MRR change (ΔMRR) and a MRR value.

Figure 4B:
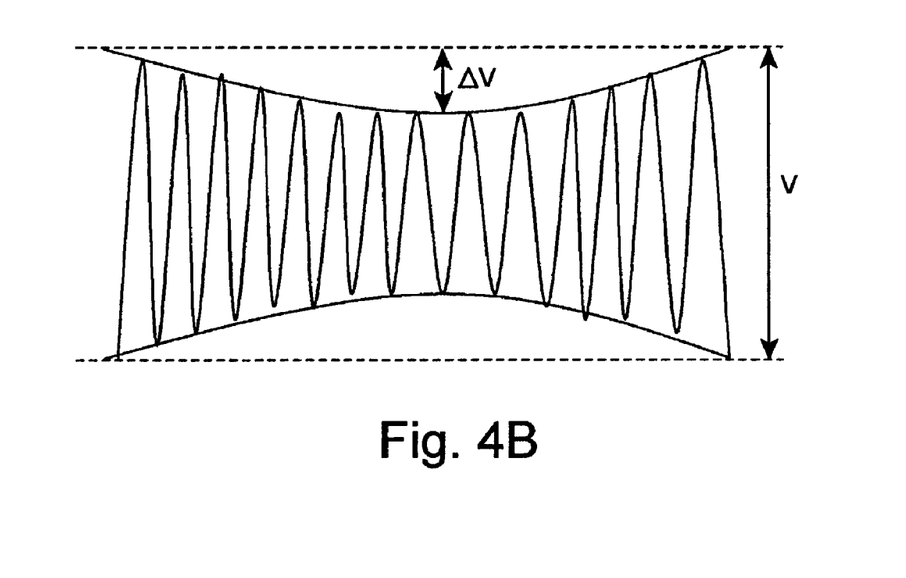
FIG. 4B illustrates an amplitude modulation envelope at essentially the rotational frequency showing a maximum voltage swing V and a deviation ΔV from the maximum voltage swing V.

FIG. 4B illustrates an amplitude modulation envelope at essentially the rotational frequency showing a maximum voltage swing V and a deviation ΔV from the maximum voltage swing V.

Figure 5:
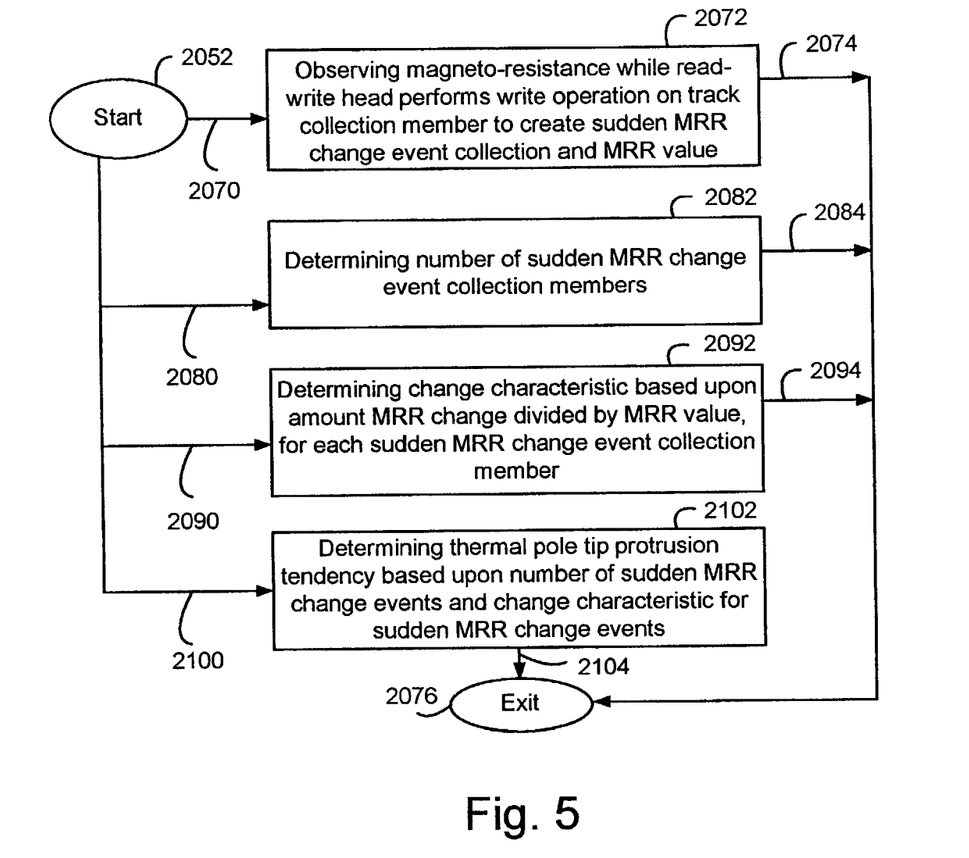
FIG. 5 illustrates a detail flowchart of operation 2052 of FIG. 3B further monitoring the change in magneto-resistance.

FIG. 5 illustrates a detail flowchart of operation 2052 of FIG. 3B further monitoring the change in magneto-resistance.

Operation 2072 performs observing the magneto-resistance while the read-write head performs the write operation on the track collection member to create a sudden MRR change event collection and to create a MRR value. Operation 2082 performs determining a number of the sudden MRR change event collection members. Operation 2092 performs determining a change characteristic based upon an amount MRR change divided by the MRR value, for each of the sudden MRR change event collection members. Operation 2102 performs determining the thermal pole tip protrusion tendency based upon the number of the sudden MRR change event collection members and based upon the change characteristic for the sudden MRR change event collection members.

Figure 6:
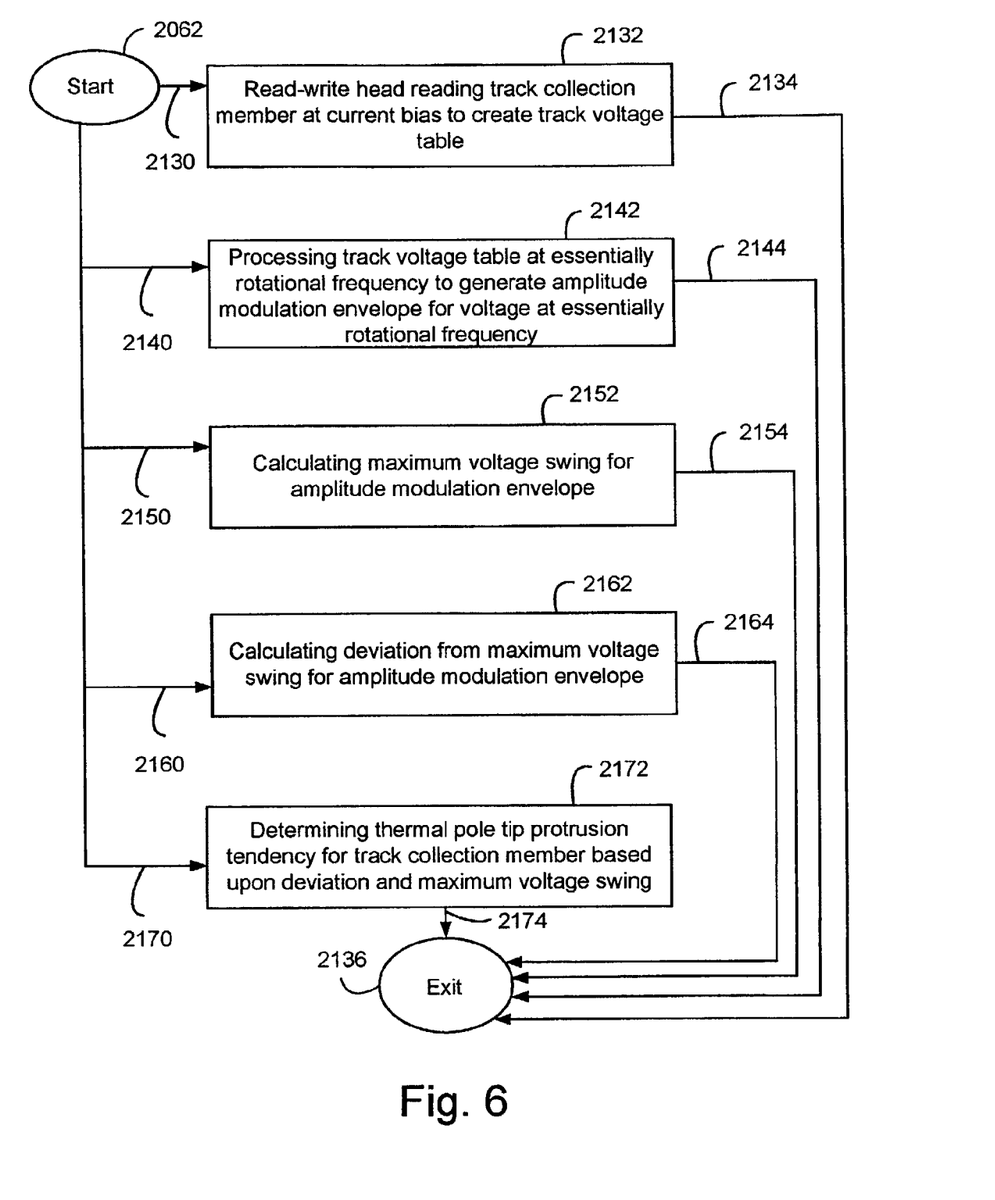
FIG. 6 illustrates a detail flowchart of operation 2062 of FIG. 3B further detecting the amplitude modulation envelope.

FIG. 6 illustrates a detail flowchart of operation 2062 of FIG. 3B further detecting the amplitude modulation envelope.

Operation 2132 performs the read-write head reading the track collection member at a current bias to create a track voltage table. Operation 2142 performs processing the track voltage table at essentially the rotational frequency to generate an amplitude modulation envelope for the voltage at essentially the rotational frequency. Operation 2152 performs calculating a maximum voltage swing for the amplitude modulation envelope. Operation 2162 performs calculating a deviation from the maximum voltage swing for the amplitude modulation envelope. Operation 2172 performs determining the thermal pole tip protrusion tendency for the track collection member based upon the deviation and based upon the maximum voltage swing.

The preceding embodiments have been provided by way of example and are not meant to constrain the scope of the following claims.

The invention claimed is:

1. A method estimating a thermal pole tip protrusion tendency for a head gimbal assembly containing a read-write head, said method comprising, for each member of a track collection, the step of:
   determining said thermal pole tip protrusion tendency for said head gimbal assembly on said track collection member; and
   said method, further comprising the step of:
   predicting said thermal pole tip protrusion for said head gimbal assembly based upon, for each of said track collection members, said thermal pole tip protrusion tendency on said track collection member;
   wherein said track collection is comprised of an inside diameter track of a disk surface and an outside diameter track of said disk surface;
   wherein said read-write head provides a magneto-resistance from a disk surface while performing a write operation to said track collection member on said disk surface and provides a voltage while reading said track collection member at a bias current, for each of said track collection members;
   wherein said disk surface rotates at a rotational frequency;
   wherein the step determining said thermal pole tip protrusion tendency is comprised of at least one member of the collection comprising the steps of:
   monitoring a change of said magneto-resistance while said read-write head performs said write operation of said track collection member to determine said thermal pole tip protrusion tendency;
   wherein the step monitoring said change is further comprised of:
   observing said magneto-resistance while said read-write head performs said write operation on said track collection member to create a sudden MRR change event collection and to create a MRR value;
   determining a number of said sudden MRR change event collection members;
   determining a change characteristic based upon an amount MRR change divided by said MRR value, for each of said sudden MRR change event collection members; and
   determining said thermal pole tip protrusion tendency based upon said number of said sudden MRR change event collection members and based upon said change characteristic for said sudden MRR change event collection members.

2. The method of claim 1, wherein said track collection is further comprised of a middle diameter track of said disk surface.

3. A method of selecting a head gimbal assembly, comprising the steps:
   estimating a thermal pole tip protrusion tendency for said head gimbal assembly as in claim 1, selecting said head gimbal assembly whenever said head gimbal assembly does not have said thermal pole tip protrusion tendency.

4. A method estimating a thermal pole tip protrusion tendency for a head gimbal assembly containing a read-write head, comprising, for each member of a track collection, the step of:
   determining said thermal pole tip protrusion tendency for said head gimbal assembly on said track collection member; and further comprising the step of:
   predicting said thermal pole tip protrusion tendency for said head gimbal assembly based upon, for each of said track collection members, said thermal pole tip protrusion tendency on said track collection member;
   wherein said track collection is comprised of an inside diameter track of a disk surface and an outside diameter track of said disk surface;
   wherein said read-write head provides a magneto-resistance from a disk surface while performing a write operation to said track collection member on said disk surface and provides a voltage while reading said track collection member at a bias current, for each of said track collection members;
   wherein said disk surface rotates at a rotational frequency;
   wherein the step determining said thermal pole tip protrusion tendency is comprised of at least one member of the collection comprising the steps of:
   monitoring a change of said magneto-resistance while said read-write head performs said write operation on said track collection member to determine said thermal pole tip protrusion tendency; and
   detecting an amplitude modulation envelope for said voltage at essentially said rotational frequency for said track collection member written to determine said thermal pole tip protrusion tendency.

5. The method of claim 4, wherein the step monitoring said change is further comprised of:
- observing said magneto-resistance while said read-write head performs said write operation on said track collection member to create a sudden MRR change event collection and to create a MRR value;
- determining a number of said sudden MRR change event collection members;
- determining a change characteristic based upon an amount MRR change divided by said MRR value, for each of said sudden MRR change event collection members; and
- determining said thermal pole tip protrusion tendency based upon said number of said sudden MRR change event collection members and based upon said change characteristic for said sudden MRR change event collection members.

6. The method of claim 4, wherein the step detecting said amplitude modulation envelope is further comprised of the steps of:
- said read-write head reading said track collection member at a current bias to create a track voltage table;
- processing said track voltage table at essentially said rotational frequency to generate an amplitude modulation envelope for said voltage at essentially said rotational frequency;
- calculating a maximum voltage swing for said amplitude modulation envelope;
- calculating a deviation from said maximum voltage swing for said amplitude modulation envelope; and
- determining said thermal pole tip protrusion tendency for said track collection member based upon said deviation and based upon said maximum voltage swing.

7. The method of claim 4, wherein said track collection is further comprised of a middle diameter track of said disk surface.

8. A method of selecting a head gimbal assembly, comprising the steps:
- estimating a thermal pole tip protrusion tendency for said head gimbal assembly as in claim 4, selecting said head gimbal assembly whenever said head gimbal assembly does not have said thermal pole tip protrusion tendency.

* * * * *